United States Patent
Rando

[11] Patent Number: 6,067,152
[45] Date of Patent: May 23, 2000

[54] ALIGNMENT RANGE FOR MULTIDIRECTIONAL CONSTRUCTION LASER

[75] Inventor: Joseph F. Rando, Los Altos Hills, Calif.

[73] Assignee: Levelite Technology, Inc., Mountain View, Calif.

[21] Appl. No.: 09/093,949

[22] Filed: Jun. 8, 1998

[51] Int. Cl.[7] .................................................. G01B 11/26
[52] U.S. Cl. .................. 356/152.1; 348/141; 356/139.1; 356/141.5
[58] Field of Search .......................... 356/139.03, 141.2, 356/141.5, 152.1, 152.2, 139.1; 348/141

[56] References Cited

U.S. PATENT DOCUMENTS

| | | | |
|---|---|---|---|
| 4,656,896 | 4/1987 | Bietz et al. . | |
| 4,668,088 | 5/1987 | Quinque et al. | 356/138 |
| 4,714,344 | 12/1987 | Hamar | 356/139.03 |
| 4,721,386 | 1/1988 | Collyer | 356/139.03 |
| 4,902,128 | 2/1990 | Siebecker et al. . | |
| 4,917,490 | 4/1990 | Schaffer, Jr. et al. . | |
| 5,090,803 | 2/1992 | Ames et al. | 356/139.03 |
| 5,118,185 | 6/1992 | Courten | 356/139.03 |
| 5,459,932 | 10/1995 | Rando et al. . | |
| 5,506,675 | 4/1996 | Lopez et al. | 356/152.1 |
| 5,519,942 | 5/1996 | Webb . | |
| 5,841,527 | 11/1998 | Shibuya et al. | 356/139.1 |

*Primary Examiner*—Stephen C. Buczinski
*Attorney, Agent, or Firm*—Thomas M. Freiburger

[57] ABSTRACT

A system for checking alignment of laser beam projecting instruments, and for enabling accurate calibration of an instrument, includes a high resolution video camera positioned to receive a laser beam from the instrument. The spot from the detected laser beam is compared on a video monitor to a spot or target position showing the location corresponding to accurate alignment of the beam. Multiple orthogonal beams from an instrument may be directed to the same video sensor using mirrors. By use of the described system the need for long beam paths to check beam alignment accuracy is avoided.

9 Claims, 6 Drawing Sheets

ALIGNMENT RANGE FOR MULTIDIRECTIONAL CONSTRUCTION LASER

BACKGROUND AND SUMMARY OF THE INVENTION

This invention is concerned with laser instruments as often used in construction. In particular, the invention addresses the problem of calibration for correct alignment of level or plumb beams or combinations of level, plumb and square beams in a laser instrument.

Figure 1:
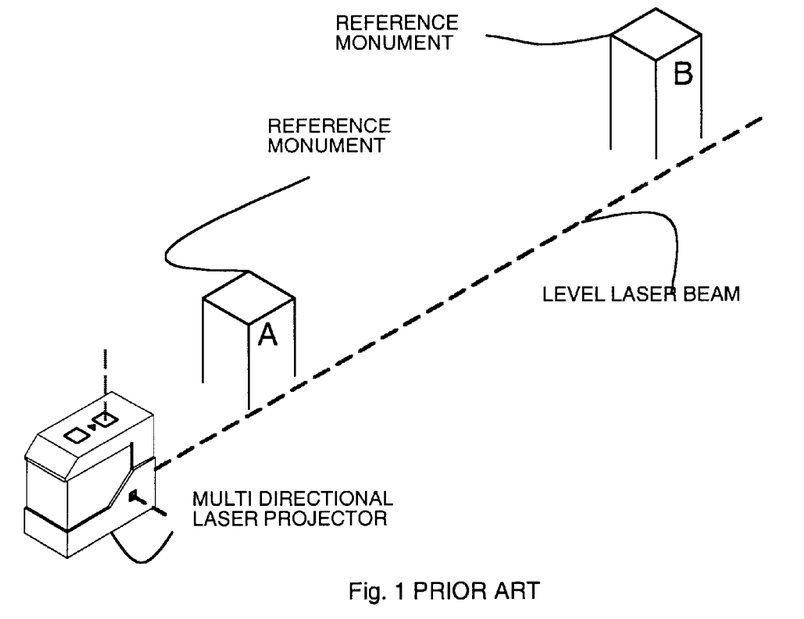
FIG. 1 is a schematic view in perspective showing a prior art method for checking beam alignment of a self-leveling laser beam projector.
Figure 2:
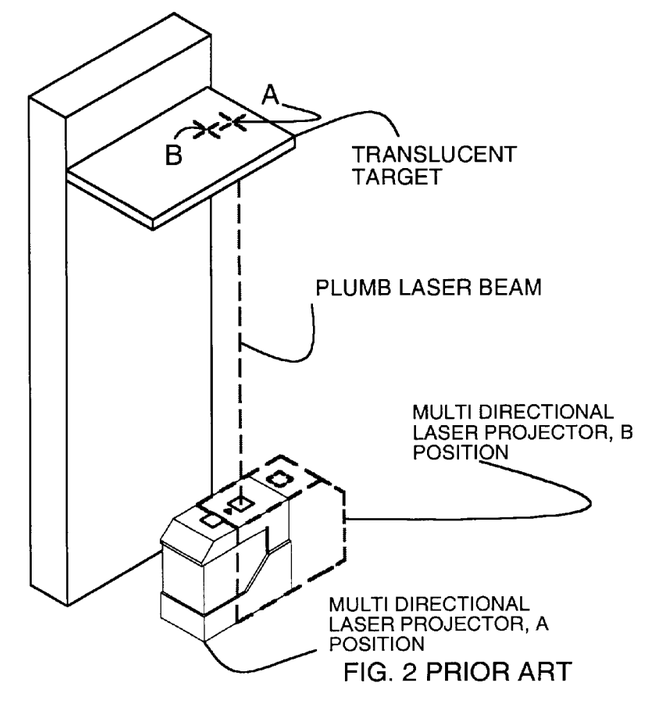
FIG. 2 is a schematic perspective view showing a prior art method for checking a plumb beam from such an instrument.

Multidirectional construction lasers produce visible reference beams of laser light at precise angles relative to each other and to the level and plumb directions. Such tools, including the LeveLite® manufactured by LeveLite Technology Inc. of Mountain View, Calif., are used widely by many construction trades such as dry wall installation, air conditioning installation, foundation layout, plumbing and many others. Conveniently aligning these beams during manufacture and while servicing is difficult because of the high angle accuracy required and the large space required in conventional methods of alignment. For example, a level beam is often calibrated using reference marks or monuments along a premeasured course. See FIG. 1, where monuments A and B are at level or a known height above level. The distances between the beam and height reference marks on the monuments are measured to align the beam to level. A distance of about 20 to 30 meters between the monuments is necessary for high accuracy. In a like manner a vertical beam may be aligned using two reference marks or targets sufficiently above the beam projector as shown in FIG. 2. A translucent target 20 to 30 meters above the projector is sufficient. In the simplest case the beam origin can be placed over a mark on the floor while the beam on the target above is marked as the point A. The projector can then be rotated 180 degrees about the beam origin and the beam location can be marked B. Because the direction of gravity is unchanged, the location of true plumb is half way between points A and B. The projector can then be calibrated by adjusting the beam so that the beam lies on the true plumb point.

The subject invention makes the alignment of a multi-directional reference lasers convenient and accurate by using lenses and a video sensor to compress the size of the measurement course from 30 meters to a matter of centimeters. Using mirror reflection, the resulting instrument can be used to align level, square and plumb beams simultaneously.

DESCRIPTION OF THE DRAWINGS

FIG. 7A is a side elevation view of the arrangement shown in FIG. 7.

DESCRIPTION OF PREFERRED EMBODIMENTS

The basic principle of the invention employs a lens to focus the collimated reference beam of an instrument to a fine spot on the small sensor of a surveillance video camera. See FIG. 3. Typically a 400 mm focal length lens 2 is placed exactly a focal length away from a video sensor 4. A focusing mirror could be used instead of a lens, if desired. In this way the position of the spot on the sensor corresponds directly to the angle of the collimated reference beam 3 emitted from a laser instrument, not shown. The instrument can be one which is self-leveling (as in U.S. Pat. No. 5,459,932) or non-self-leveling (as in U.S. Pat. No. 5,519,942), for example. A typical sensor is 7.5 mm square providing a field of view of 67 minutes. A video camera such as a Burle TC952 has a resolution of approximately 0.01 mm and is able to provide accuracy better than 10 seconds of arc for the illustrated system wherein the distance from lens to camera is 400 mm. In some applications it is sufficient that the system be accurate to two minutes of angular error, or more preferably, one minute or better.

Figures 3, 4:
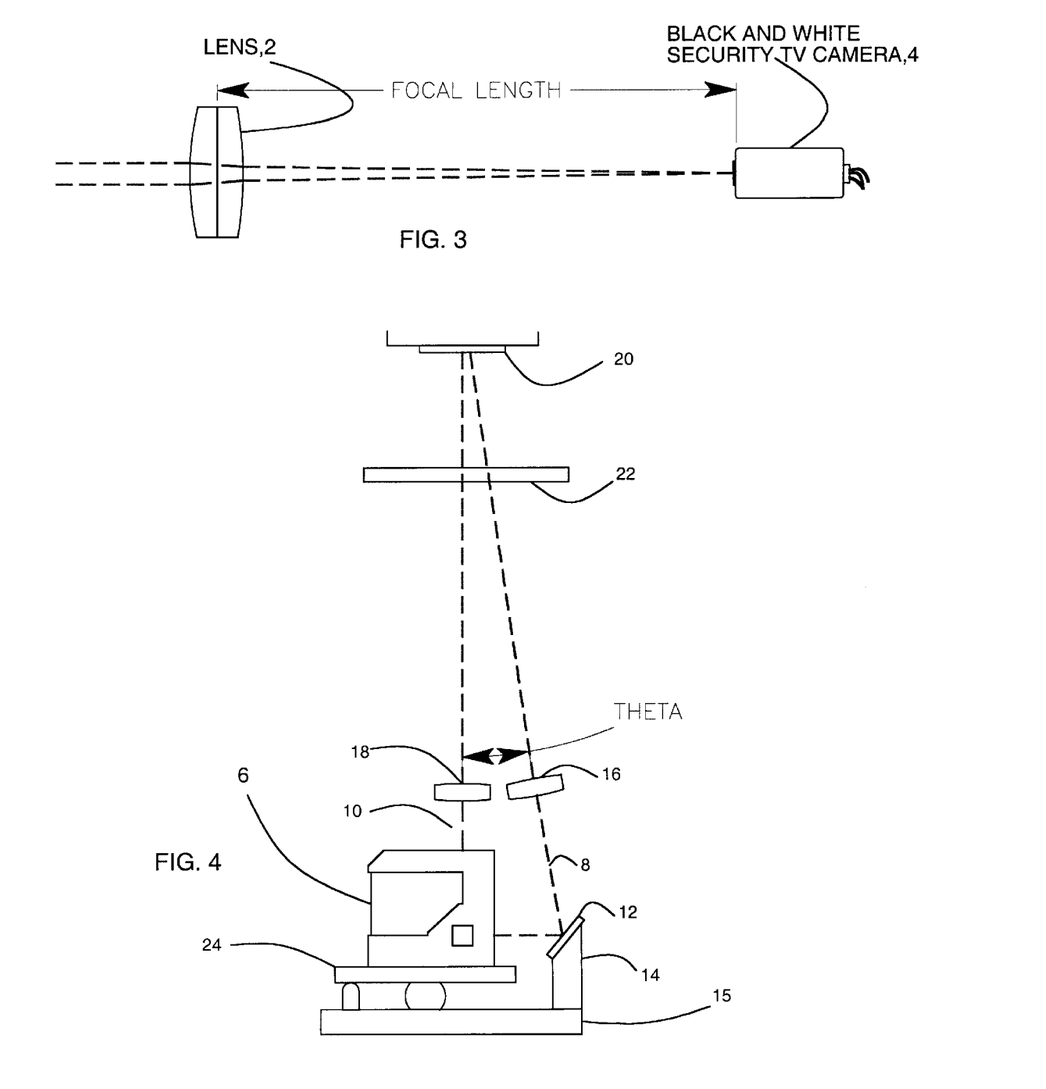
FIG. 3 is an elevation view illustrating a part of the system of the invention.
FIG. 4 is an elevation view schematically indicating an apparatus according to the invention for checking the alignment of level and plumb beams of a laser beam projector.

Using a mirror to reflect the beams, the level and plumb beams may be simultaneously seen on the same video monitor. This beam routing is shown in FIG. 4. A laser reference projector 6 produces a collimated level beam 8 and a collimated plumb beam 10. The level beam is reflected by a mirror 12 mounted on a stand 14 secured to a base 15, so that both beams are directed to the same video sensor 20. The mirror 12 can be adjusted in angle, adjusting mechanism not shown. The angle theta between the beams is chosen large enough that lenses 16 and 18 can have centers spaced far enough apart that the lenses can be wide enough to receive the full range of error in the beams 8 and 10. At the same time, this angle is chosen small enough so that the cosine error at the sensor 20 due to different approach angles of the two beams is small so as to maintain consistent sensitivity among beams. An angle of six degrees for a 400 mm focal length lens with a 37 mm diameter, the lens being within 30 mm of the instrument, is satisfactory, or some lesser angle.

The lens 16 focuses the beam 8 on the video sensor 20, while the lens 18 focuses the beam 10 on the same sensor 20. A filter 22 reduces the intensity of the focused spot so as not to damage the sensitive video sensor. A tilt table 24 on the base or platform 15 is used to tilt the projector to allow measurement of its accuracy for different tilt angles.

Figure 5:
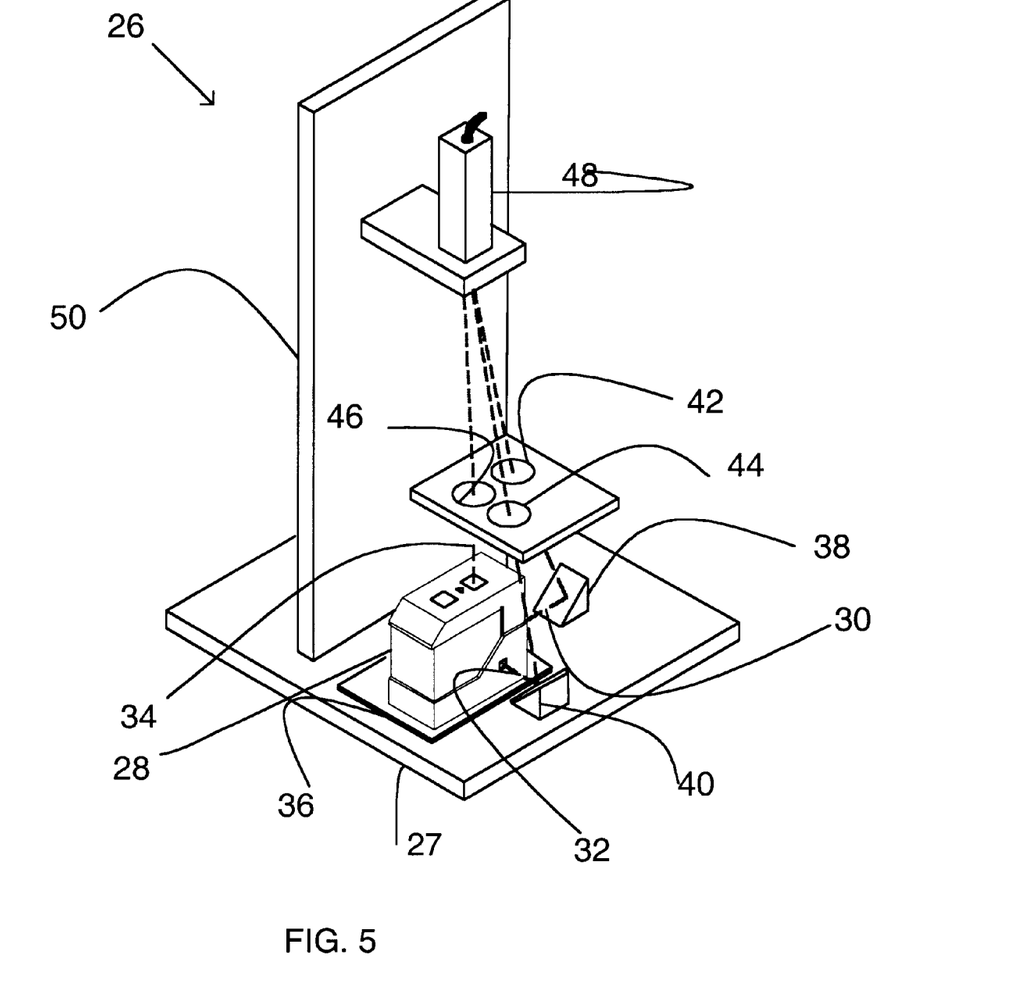
FIG. 5 is a perspective view showing a system of the invention for checking plumb, level and level-to-square beams from a three-beam laser projector.

Other reference beams in the horizontal plane may be projected on the same sensor using a mirror for each beam in a system shown generally at 26 in FIG. 5. A base 27 supports an adjustable tilt table 36 which simulates a tilted surface on which the projector 28 must remain accurate. Adjustable mirrors 38 and 40 reflect the level and square-to-level beams 30 and 32 respectively. The plumb beam 34 goes through a lens 46 while lenses 42 and 44 focus the level and square beams respectively. All three focused beams strike the same video sensor on a video camera 48. The entire assembly is mounted on the base or platform 27 which is firmly mounted to a stable floor and which has an upright portion 50. A filter (not shown) directly in front of the sensor (similar to the filter 22 of FIG. 4) reduces the intensity of the laser light to accommodate the video sensor.

Figure 6:
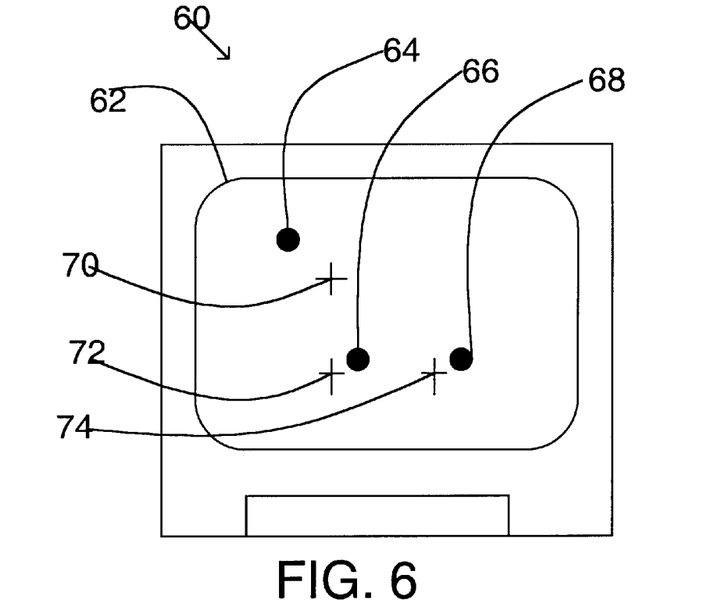
FIG. 6 is a schematic view showing a screen of a video monitor and indicating spots representing the beams from a laser instrument as in FIG. 5, as compared to reference markings on the monitor.

FIG. 6 shows the screen 62 of a video monitor 60. The screen 62 has three circular spots of light from the three beams on the laser projector. The illustrated spots 64, 66 and 68 are the level, plumb and level-to-square beams respectively. Marks 70, 72 and 74 are marks on the screen which indicate the correct location for the spots for beams which are ideally level, plumb and level-to-square. The positions of the permanent marks on the screen are determined by using a laser projector with accurate beams and subsequently adjusting the camera location and the mirror adjustments to place the target marks 70, 72, 74 in a generally centralized region of the screen for an orderly analysis and to allow room for instrument error without the spots being off the screen. The target marks 70, 72, 74 could be placed directly on the monitor screen 62, or on an overlay on the screen, or they could be generated by marks placed on the surface of the video sensor 48. They could also be generated electronically, as by time-based ticks in the video scan, located under the control of an operator, or they could be created by additional laser beams focused onto the video sensor 48 as references, again, adjustable by the operator.

Figure 7:
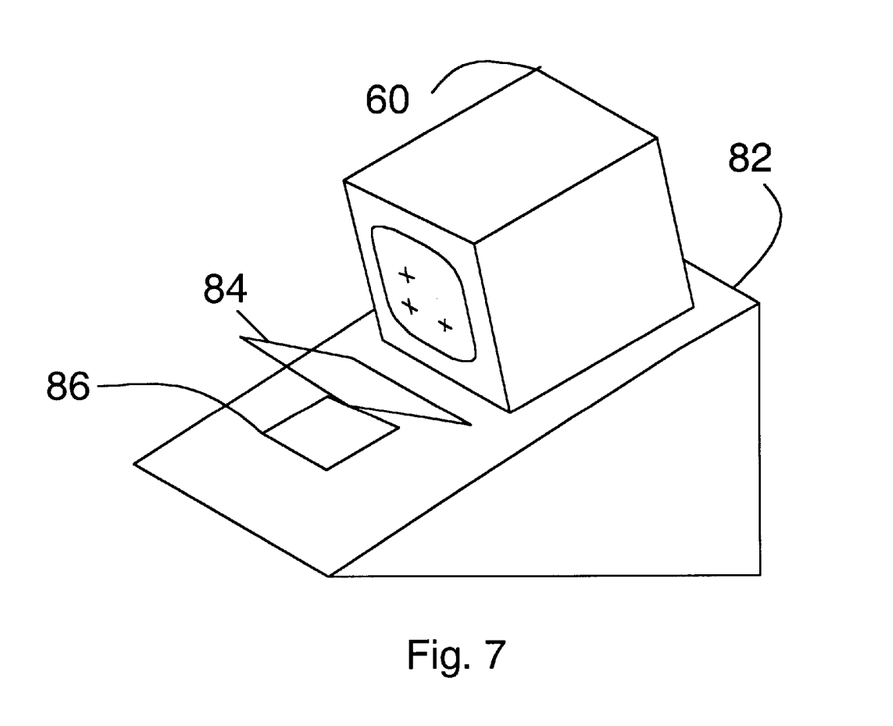
FIG. 7 is a perspective view showing the video monitor in an arrangement which enables an operator to prepare a data sheet for each instrument checked.

To enhance the record keeping options of the system, a beam splitter can be used to superimpose the image of the spots on the video monitor with a paper data sheet 86 which can be used to record the angle of the spots relative to true level and plumb as shown in FIG. 7. The monitor 60 is shown mounted on a platform 82 tilted at 45 degrees to the horizontal. A beam splitter 84 is horizontal so that the angle between the beam splitter and the surface of the platform is also 45 degrees, and for convenience of an operator to peer down through the beam splitter toward the data sheet 86. For the superimposition of images, the extended plane surfaces of the screen 62, platform 82, and beam splitter 84 are adjusted to intersect in the same line. In this way the marks on the paper 86 are analogous to marks on the screen in their size and location. This is true regardless of eye movement toward or away from the screen as shown in FIG. 7A. FIG. 7A, a side view, shows the position of the beam splitter 84 relative to the screen 62 and the data sheet 86. In this case the image of the screen and data sheet are superimposed on each other without parallax error. The eye 87 is shown as viewing the same spot on the screen from two positions.

Although the platform 82 and monitor 60 are shown angled at 45°, they could be at any desired angle so long as the screen 62, beam splitter 84 and platform 82 are in the relationship described.

Figure 8:
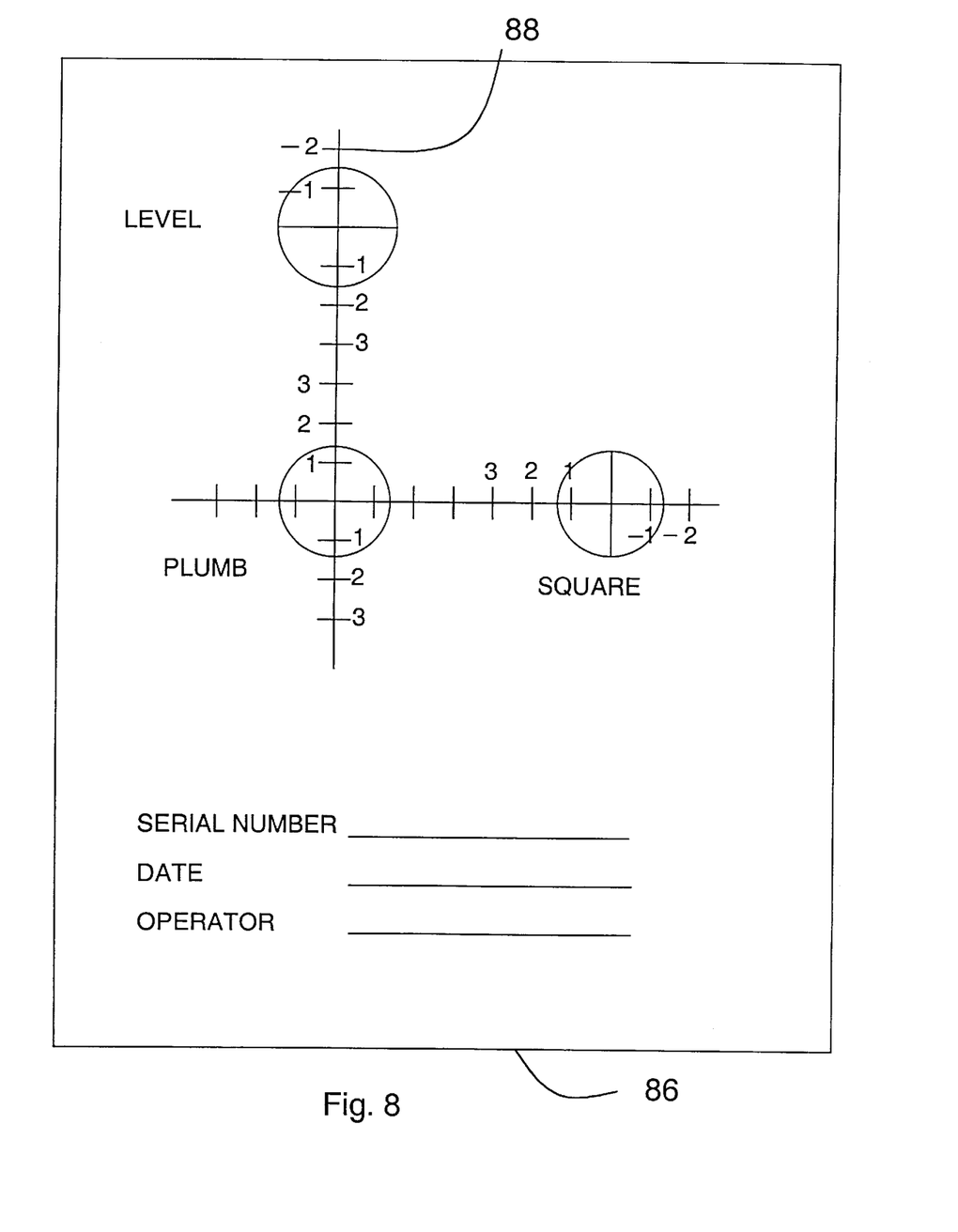
FIG. 8 is a view showing a data sheet having a coordinate system, for use in recording data as in FIGS. 7 and 7A.

The paper may comprise a data sheet 86 with reference marks corresponding to the marks of the screen is placed on the platform for recording data. The data sheet of FIG. 8 contains a coordinate system 88 for location of each reference beam and a scale calibrated in minutes. In this way a separate data sheet can be maintained for each instrument with the actual beam positions marked on the data sheet as points drawn by hand.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A system for checking for correct alignment of a laser beam projecting instrument which projects at least two beams which are orthogonal when the instrument is accurately calibrated, comprising:

a base or platform adapted to stably receive the laser beam projecting instrument, in a position such that the instrument projects a collimated laser beam, comprising one of the two orthogonal beams, in an intended general direction, a video sensor in the path of one laser beam from the instrument, at least one mirror in the path of another of the laser beams and positioned such that both laser beams are directed at the video sensor, focusing means in the beam paths between the instrument and the video sensor for focusing the collimated laser beams to small spots at the video sensor, a video monitor connected to the video sensor to display an image of a field of view detected by the video sensor, so that the video monitor displays the position of the laser beams as spots within the sensor's field of view, and reference means providing a reference mark on the video monitor to represent correct alignment of the laser beam, and wherein said reference means include means for generating reference marks for comparison on the video monitor to each of the two beams from the instrument.

2. The system of claim 1, wherein the reference means comprises markings affixed directly to a screen of the video monitor.

3. The system of claim 1, wherein the reference means includes means for generating the reference mark electronically on the video monitor.

4. The system of claim 1, further including a data sheet having reference markings corresponding to accurate beam projection for instruments to be checked, the data sheet being adjacent to the video monitor, and data transfer means enabling an operator conveniently to transfer the position of the spot on the monitor representing the laser beam to the data sheet to represent the beam projected by each particular instrument checked, alongside the reference markings on the data sheet.

5. The system of claim 4, wherein the reference markings on the data sheet include a coordinate system.

6. The system of claim 1, further including a data sheet having reference markings corresponding to accurate beam projection for instruments to be checked, the data sheet being adjacent to the video monitor, and means enabling an operator conveniently to transfer the position of the spots on the monitor representing the laser beams to the data sheet to represent the beams projected by each particular instrument checked, alongside the reference markings on the data sheet.

7. The system of claim 6, wherein the reference markings on the data sheet include a coordinate system.

8. The system of claim 4, wherein the data transfer means comprises the data sheet being placed in front of the video monitor on a surface which is at 90° to the screen of the monitor, a beam splitter mirror between the monitor screen and the data sheet with means positioning the beam splitter mirror at 45° to planes of each of the monitor screen and the data sheet, with planes of the monitor screen, mirror and data sheet intersecting substantially in a single line, and the beam splitter mirror being reflective from its upper surface and transmissive through the mirror from below, whereby an operator can view the data sheet through the beam splitter mirror to accurately transfer the laser beam spot on the monitor to the data sheet.

9. A system for checking for correct alignment of a laser beam projecting instrument, comprising:

a base or platform adapted to stably receive the laser beam projecting instrument, in a position such that the instrument projects a collimated laser beam in an intended general direction, a video sensor in the path of the laser beam from the instrument, focusing means in the beam path between the instrument and the video sensor for focusing the collimated laser beam to a small spot at the video sensor, a video monitor connected to the video sensor to display an image of a field of view detected by the video sensor, so that the video monitor displays the position of the laser beam as a spot within the sensor's field of view, reference means providing a reference mark on the video monitor to represent correct alignment of the laser beam, and the instrument comprising a self-leveling beam projecting instrument, and wherein the platform or base includes an adjustment providing for tilt of the instrument relative to gravity so that beam alignment can be checked for different tilt angles of the self-leveling instrument.

* * * * *

UNITED STATES PATENT AND TRADEMARK OFFICE
CERTIFICATE OF CORRECTION

PATENT NO. : 6,067,152
DATED : May 23, 2000
INVENTOR(S) : Joseph F. Rando

Page 1 of 1

It is certified that error appears in the above-identified patent and that said Letters Patent is hereby corrected as shown below:

Column 4,
Line 7, 8 and 9: all commas should be deleted.
Line 28: "include" should be changed to --includes--.

Column 5,
Line 5: before "laser" insert --self-leveling--.
Line 8: the comma should be deleted.

Column 6,
Lines 8-9: delete "the instrument comprising a self-leveling beam projecting instrument, and".
Line 11: "gravity" should be deleted and replaced by --the lens and the video sensor--.

Signed and Sealed this

Thirty-first Day of July, 2001

*Attest:*

*Attesting Officer*

NICHOLAS P. GODICI
*Acting Director of the United States Patent and Trademark Office*